United States Patent [19]
Cummings

[11] Patent Number: 5,740,759
[45] Date of Patent: Apr. 21, 1998

[54] BIRD FEEDER

[76] Inventor: Michael W. Cummings, 854 W. 600 North, Salt Lake City, Utah 84116

[21] Appl. No.: 767,024

[22] Filed: Dec. 16, 1996

[51] Int. Cl.$^6$ ............................................. A01K 7/00
[52] U.S. Cl. ................................. 119/72; 215/11.1
[58] Field of Search ................... 119/72, 51.03, 119/725, 57.9, 77; 220/254, 255, 256; 215/11.1, 11.6

[56] References Cited

U.S. PATENT DOCUMENTS

| | | | |
|---|---|---|---|
| D. 252,288 | 7/1979 | Kilham | D30/14 |
| D. 330,097 | 10/1992 | Bescherer et al. | D30/124 |
| D. 331,647 | 12/1992 | Embree | D30/124 |
| 3,752,124 | 8/1973 | Gabriel | 119/72 X |
| 3,838,664 | 10/1974 | Atchley | 119/72.5 |
| 4,101,042 | 7/1978 | Strong et al. | 215/11 R |
| 4,393,813 | 7/1983 | Sou | 119/72.5 |
| 5,156,284 | 10/1992 | del Pilar Pla Rodriguez et al. | 215/11.6 |
| 5,176,278 | 1/1993 | Quarberg | 220/256 |
| 5,188,253 | 2/1993 | Poore et al. | 220/254 X |
| 5,245,951 | 9/1993 | Nicholson | 119/72.5 |
| 5,303,674 | 4/1994 | Hyde, Jr. | 119/77 |
| 5,328,043 | 7/1994 | Ray | 215/11.1 X |
| 5,353,742 | 10/1994 | Mauritz | 119/77 |
| 5,354,274 | 10/1994 | Demeter et al. | 215/11.1 X |
| 5,454,348 | 10/1995 | Colwell et al. | 119/72 |
| 5,573,507 | 11/1996 | Moser et al. | 215/11.1 X |

*Primary Examiner*—John J. Wilson
*Assistant Examiner*—Yvonne R. Abbott
*Attorney, Agent, or Firm*—David L. Volk

[57] ABSTRACT

A feeding tube includes a first end opposite a second end, and an interior. A first disc is mounted to the first end and has a first aperture there-through, the first aperture being aligned with the interior of the tube. A solid second disc has a diameter substantially equal to the first disc. A cap has a planar surface and a second aperture through the planar surface. A container has structure forming an opening and configured to removably receive the cap over the opening. The first disc is configured to cover the opening and to fit within the cap in parallel relationship to the planar surface. The container is filled with liquid bird food. The cap, the tube and the first disc may be arranged such that the container is sealed, and may also be arranged such that the feeding tube is directed outwardly from the container and a bird may feed from the tube.

8 Claims, 5 Drawing Sheets

BIRD FEEDER

BACKGROUND OF THE INVENTION

1. Field of the Invention

The present invention relates to bird feeders, particularly to a feeder suitable for hummingbirds.

2. Description of the Related Art

Bird feeders are used by bird lovers and bird watchers of every age. Owners of bird feeders enjoy watching the birds up close as they feed, and they feel satisfaction from providing food for wild birds.

The problem with most bird feeders is that they require upkeep, including cleaning the feeders and re-filling them with food. What is needed is a low cost, easy to use disposable bird feeder which is already filled with food.

SUMMARY OF THE INVENTION

The bird feeder of the present invention includes a feeding tube having a first end opposite a second end. A first disc is mounted to the first end and has a first aperture therethrough, the first aperture being aligned with the interior of the tube. A solid second disc has a diameter substantially equal to the first disc. A cap has a planar surface and a second aperture through the planar surface. A container has structure forming an opening and configured to removably receive the cap over the opening. The first disc is configured to cover the opening and to fit within the cap in parallel relationship to the planar surface. The container is filled with liquid bird food. The cap, the tube and the first disc may be arranged such that the container is sealed, and may also be arranged such that the feeding tube is directed outwardly from the container and a bird may feed from the tube.

Accordingly, several objects and advantages of the present invention are:

a. to provide a bird feeder which is convenient;
b. to provide a bird feeder which is easy to use;
c. to provide a bird feeder which does not require any cleaning or upkeep;
d. to provide a bird feeder which may be sold pre-filled with food;
e. to provide a bird feeder which is disposable; and
f. to provide a bird feeder which is low in cost.

Still further objects and advantages will become apparent from the ensuing description and drawings.

DETAILED DESCRIPTION

Figure 1:
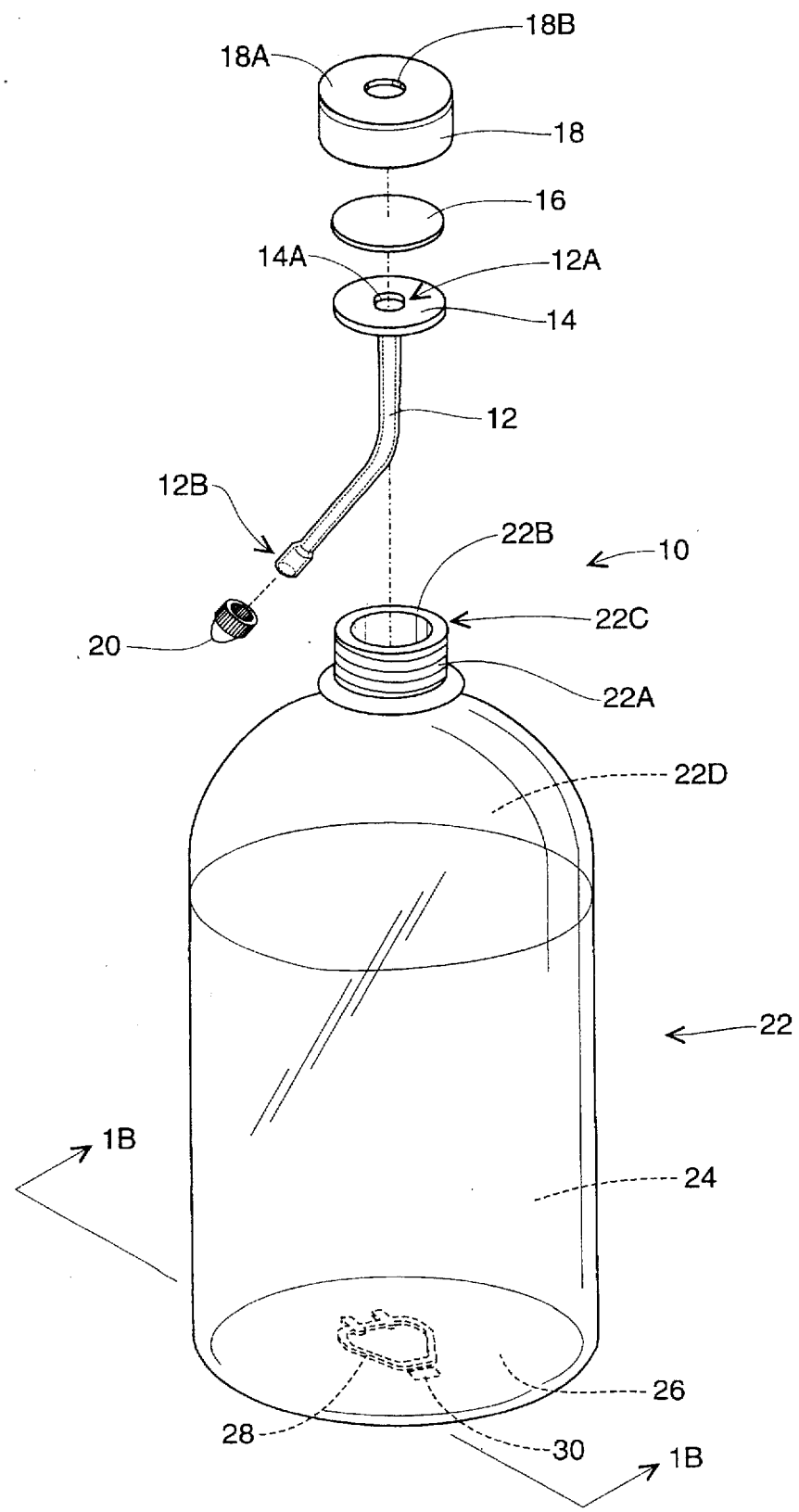
FIG. 1 is an exploded perspective view of the bird feeder, oriented and arranged as it would normally be for storage or for sale.

FIG. 1 is an exploded perspective view of a bird feeder 10, oriented and arranged as it would normally be for storage or for sale. The bird feeder 10 includes an elongated feeding tube 12 which is bent at its approximate center to form an obtuse angle with itself. The tube 12 has a first end 12A and a second end 12B. A first disc 14 includes a first aperture 14A positioned in the center of the first disc 14, and is mounted to the first end 12A of the tube 12 such that the first aperture 14A is aligned with the interior of the tube 12. A tube cap 20 is configured to fit over the second end 12B of the tube 12.

A solid second disc 16 has substantially the same diameter as the first disc 14.

A threaded cap 18 includes a planar surface 18A with a second aperture 18B positioned in the center of the planar surface 18A. A container 22 includes a threaded neck 22A which is approximately the same diameter as the first and second discs 14, 16, and which is threaded to receive the cap 18 thereon. The neck 22A includes an opening 22B at its distal end 22C, and is in fluid communication with the container interior 22D.

The container 22 includes a liquid bird food 24 therein, which may be a solution of sugar in water, or any other suitable substance. The container 22 includes a base 26, and a ring 28 hingedly connected to the base 26. In this view, the ring 28 is shown in a closed position, retained against the base 26 by a clip 30.

Figure 1A:
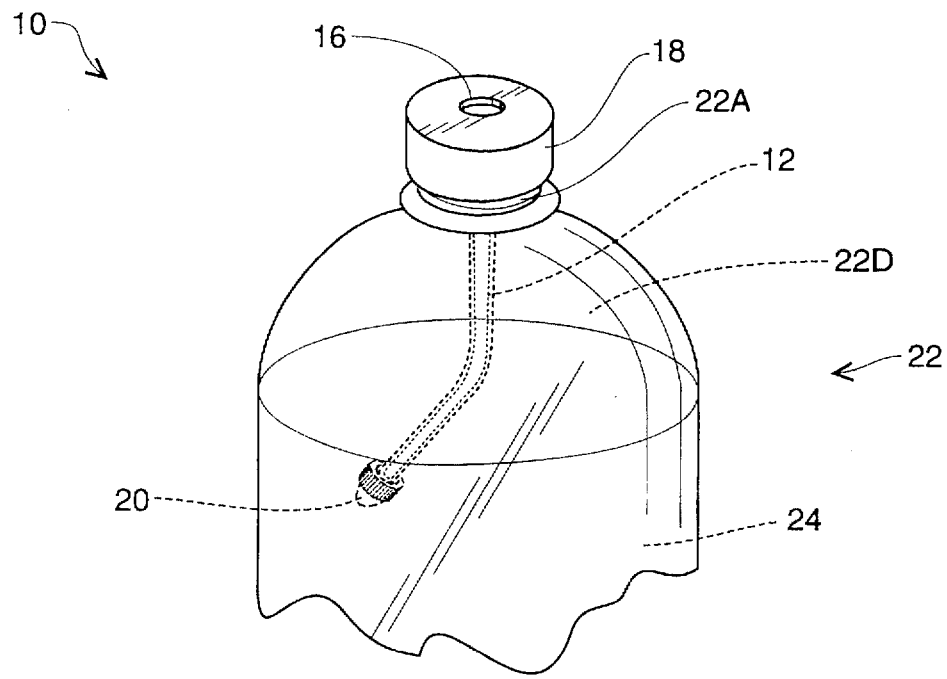
FIG. 1A is a partial perspective view of the bird feeder, oriented and arranged as it would normally be for storage or for sale.

FIG. 1A is a partial perspective view of the bird feeder 10, oriented and arranged as it would normally be for storage or for sale. Referring to FIGS. 1 and 1A, the tube cap 20 is placed on the second end 12B of the tube 12, the tube 12 is inserted into the container 22 through the opening 22B, and the first disc 14 rests against the distal end 22C of the neck 22A. The second disc 16 is placed over the first disc 14, and the cap 18 is positioned over the first and second discs 14, 16 and threadedly connected to the neck 22A of the container 22. The ring 28 is in the closed position, retained against the base 26 by the clip 30. In this arrangement, the bird food 24 is retained securely within the container 22, and the bird feeder 10 may be stored or sold in this condition.

The second disc 16 may be manufactured of plastic, or rubber for greater sealing characteristics, and serves to maintain a seal to prevent the liquid bird food 24 from leaking out of or evaporating from the container 22. Similarly, the first disc 14 may be manufactured of plastic or of rubber for greater sealing characteristics. It is also possible to include a conventional rubber gasket (not shown) within the cap 18, positioned against the planar surface 18A, to improve the seal of the container 22. The second disc 16 may be deleted from the present invention, and the necessary sealing properties may be provided by the first disc 14, the cap 18, and perhaps the conventional rubber gasket (not shown).

Figure 1B:
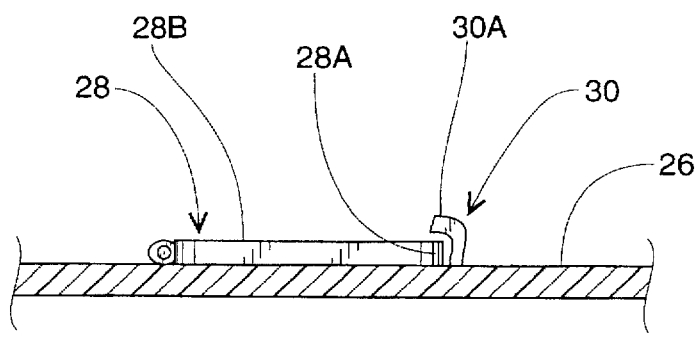
FIG. 1B is a partial cross-sectional view taken along line 1B—1B of FIG. 1.

FIG. 1B is a partial cross-sectional view taken along line 1B—1B of FIG. 1. The ring 28 is hingedly connected to the base 26 and is held against the base 26 by a clip 30 at the ring distal end 28A. In this embodiment, the clip 30 is made of plastic, is flexibly attached to the base 26, and is preferably formed integrally with the base 26. The clip 30 includes a lip 30A which extends over the outer surface 28B of the ring 28 to retain the ring 28 securely against the base 26. Because the clip 30 is flexibly attached to the base 26, it may be alternatively pulled away from the ring 28 and allowed to spring back to urge itself against the ring 28, to facilitate moving the ring 28 between the closed position and an open position.

Figure 2:
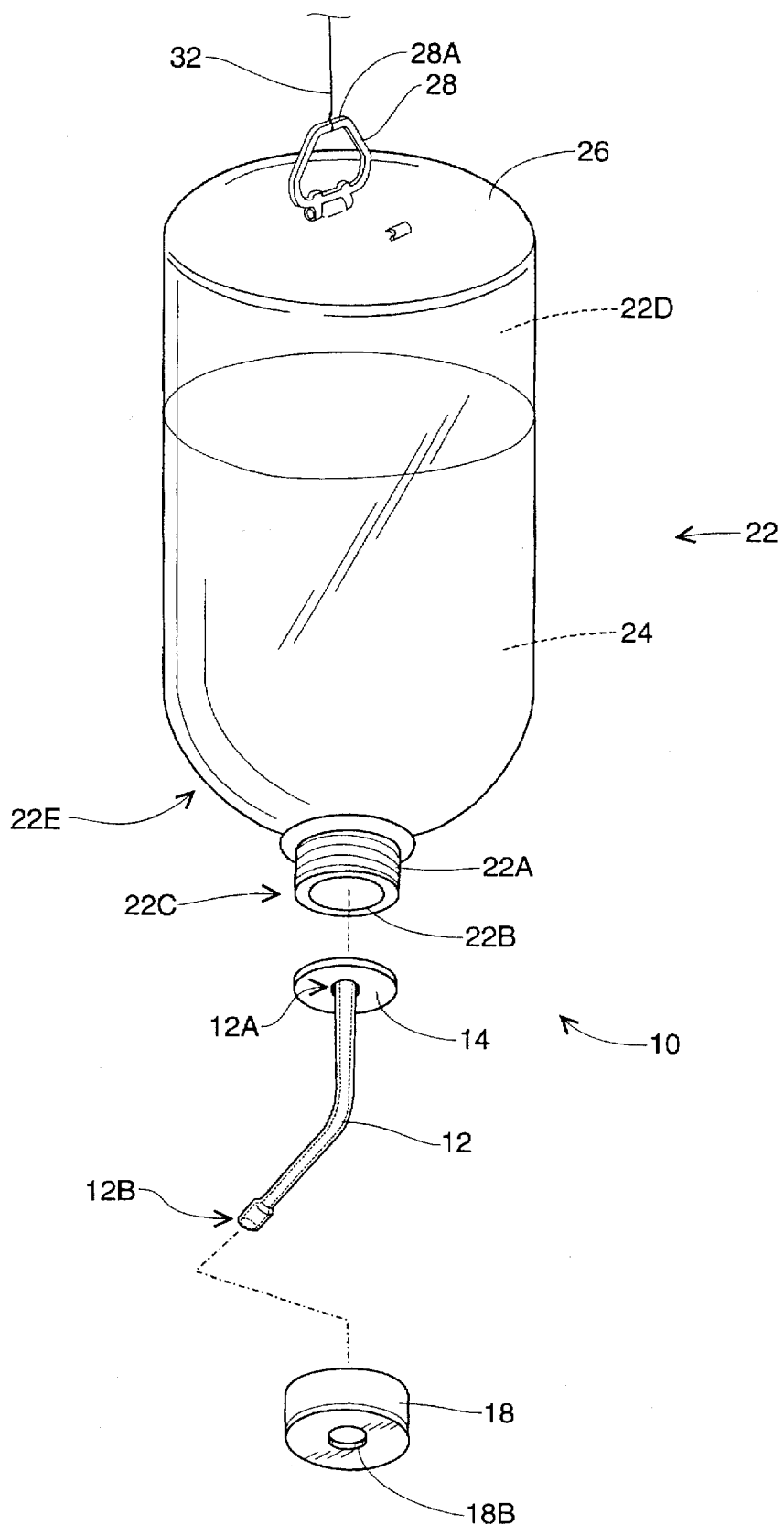
FIG. 2 is an exploded perspective view of the bird feeder, oriented and arranged as it would normally be in use.
Figure 2A:
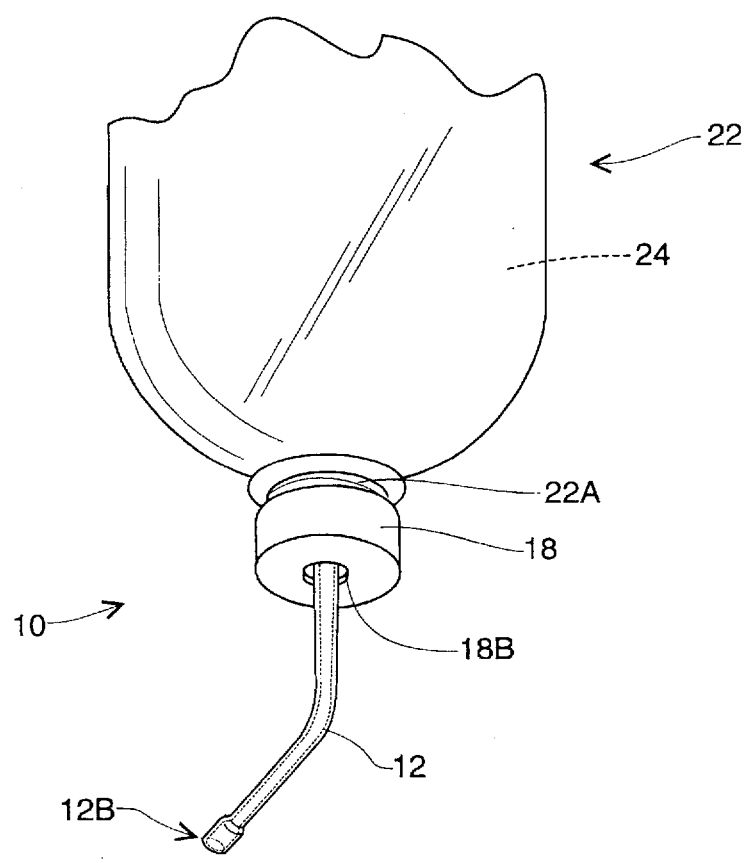
FIG. 2A is a partial perspective view of the bird feeder, oriented and arranged as it would normally be in use.

FIG. 2 is an exploded perspective view of the bird feeder 10, oriented and arranged as it would normally be in use. In use, the ring 28 is moved to the open position extending away from the base 26 of the container 22, and the container 22 is hung by string, wire or other suspending means 32 such that the opening 22B is positioned on a lower portion 22E of the container 22. FIG. 2A is a partial perspective view of the bird feeder 10, oriented and arranged as it would normally be in use. Referring to FIGS. 2 and 2A, the first disc 14 is placed adjacent the opening 22B such that the tube 12 points generally downward. The cap 18 is slid over the tube 12, such that the tube 12 passes through the second aperture 18B, and then the cap 18 is threadedly connected onto the neck 22A.

In this position, even with the tube cap 20 removed from the tube 12, the liquid bird food 24 will not normally flow out of the container 22, because of a natural water seal. The liquid bird food 24 will fill the tube 12 all of the way to the second end 12B, but will not flow outwardly therefrom because there exists no passage for air to flow into the container 22 to replace the bird food 24 flowing out of the container. The bird food 24 will flow out of the container 22 when a bird (not shown) begins to drink the bird food 24 from the second end 12B of the container 22. Although it is envisioned that the bird feeder 10 would be used primarily to feed hummingbirds, any bird which feeds in a similar manner may feed from the bird feeder 10.

Figure 3:
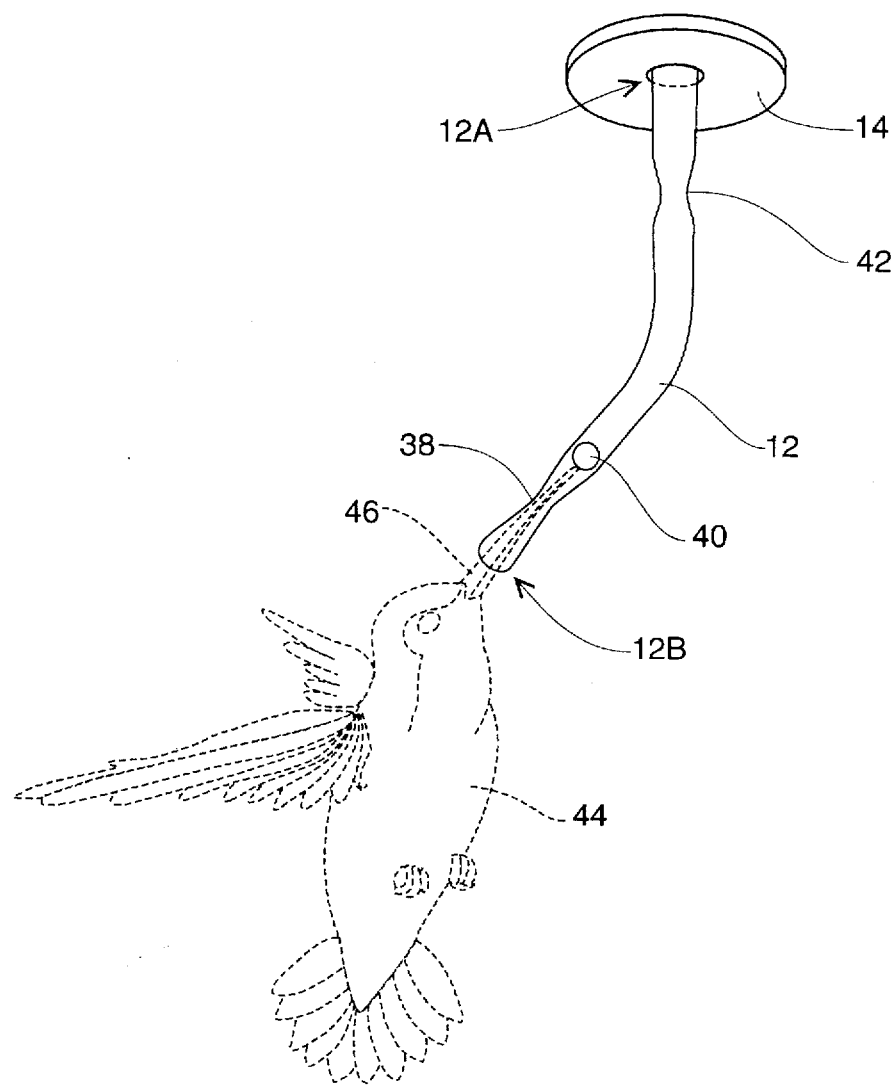
FIG. 3 is a persepective view of an alternate embodiment of the feeding tube.

FIG. 3 is a perspective view of an alternate embodiment of the feeding tube 12. The tube 12 includes a circumferentially disposed first depression 38 positioned proximate the second end 12B of the tube 12, and a circumferentially disposed second depression 42 is positioned proximate the first end 12A of the tube 12. A sphere 40 is positioned inside the tube 12 between the first depression 38 and the second depression 42. The first depression 38 acts to keep the sphere 40 from falling out of the first end 12A of the tube 12, and the second depression 42 acts to keep the sphere 40 from falling out of the second end 12B of the tube 12. The sphere 40 acts to keep the liquid bird food 24 from dripping out of the container 22, in case the natural water seal is ever insufficient for this purpose. A hummingbird 44 may insert his thin beak 46 through the open second end 12B to lick the liquid bird food 24 off of the sphere 40.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. The scope of the invention is to be limited only by the following claims and their legal equivalents.

The invention claimed is:

1. A bird feeder comprising:
   a. a feeding tube having a first end opposite a second end;
   b. the tube having an interior;
   c. the tube having a circumferentially disposed first depression positioned proximate the second end of the tube, a circumferentially disposed second depression positioned proximate the first end of the tube, and a sphere positioned inside the tube between the first depression and the second depression;
   d. a first disc mounted to the first end and having a first aperture there-through, the first aperture being aligned with the interior of the tube;
   e. a cap having a planar surface and having a second aperture through the planar surface, the second aperture sized to permit the tube to be inserted there-through;
   f. a container having a base, and structure forming an opening opposite the base, the container configured to removably receive the cap over the opening;
   g. the first disc configured to cover the opening and to fit within the cap in parallel relationship to the planar surface;
   h. a solid second disc, the first disc and the second disc having substantially equal diameters;
   i. whereby when the container is suspended such that the opening is below the base, and the tube is inserted through the second aperture, and the first disc is fit within the cap between the planar surface and the opening, and the cap is secured to the opening, bird food within the container will flow into the tube, and when the second disc is placed within the cap between the first disc and the planar surface, and the cap is secured to the opening, and the first disc is positioned within the cap such that the tube extends into the container, the second aperture is sealed by the second disc to essentially seal the container.

2. The bird feeder of claim 1, wherein the container includes bird food therein.

3. The bird feeder of claim 2, wherein the bird food is a liquid solution.

4. The bird feeder of claim 3, wherein the bird food comprises water and sugar.

5. The bird feeder of claim 3, further including a means for hanging the container such that the opening is positioned on a lower portion of the bird feeder, whereby the bird food may flow into and fill the tube when the tube is secured to the opening with the first end of the tube positioned adjacent the opening.

6. The bird feeder of claim 1, further including a tube cap configured to fit over the second end of the tube.

7. A bird feeder comprising:
   a. a feeding tube having a first end opposite a second end;
   b. the tube having an interior;
   c. a sphere retained inside the tube;
   d. a first disc mounted to the first end and having a first aperture there-through, the first aperture being aligned with the interior of the tube;
   e. a cap having a second aperture sized to permit the tube to be inserted there-through;
   f. a container having structure forming an opening, the container configured to removably receive the cap over the opening;
   g. the first disc configured to cover the opening and to fit within the cap;
   h. a second disc configured to fit within the cap and to cover the second aperture;
   i. whereby when the container is suspended such that the opening is positioned on a lower portion of the container, and the tube is inserted through the second aperture, and the first disc is fit within the cap between the second aperture and the opening, and the cap is secured to the opening, bird food within the container will flow into the tube, and when the second disc is placed within the cap between the first disc and the second aperture, and the cap is secured to the opening, and the first disc is positioned within the cap such that the tube extends into the container, the second aperture is sealed by the second disc to essentially seal the container.

8. A bird feeder comprising:
   a. a feeding tube having a first end opposite a second end;
   b. the tube having an interior;
   c. a sphere retained inside the tube;
   d. a first disc mounted to the first end and having a first aperture there-through, the first aperture being aligned with the interior of the tube;

e. a cap having a second aperture sized to permit the tube to be inserted there-through;
f. a container having a base, and structure forming an opening generally opposite the base, the container configured to removably receive the cap over the opening;
g. the first disc configured to cover the opening and to fit within the cap;
h. a hanger hingedly connected to the base, the hanger being pivotal from a closed position substantially parallel to and against the base, to an open position extending away from the base;
i. whereby when the container is suspended from the hanger such that the opening is below the base, and the tube is inserted through the second aperture, and the first disc is fit within the cap between the second aperture and the opening, and the cap is secured to the opening, bird food within the container will flow into the tube.

* * * * *